United States Patent
Lahtinen et al.

(12) 
(10) Patent No.: US 6,745,029 B2
(45) Date of Patent: Jun. 1, 2004

(54) METHOD AND ARRANGEMENT FOR HANDLING NETWORK SPECIFIC SUBSCRIBER DATA DURING ROAMING BY USE OF SIM CARD INFORMATION STORAGE

(75) Inventors: Lauri Lahtinen, Espoo (FI); Heikki Einola, Helsinki (FI); Seppo Huotari, Espoo (FI); Markku Jylhä-Ollila, Helsinki (FI)

(73) Assignee: Nokia Corporation, Espoo (FI)

( * ) Notice: Subject to any disclaimer, the term of this patent is extended or adjusted under 35 U.S.C. 154(b) by 35 days.

(21) Appl. No.: 09/331,802

(22) PCT Filed: Jan. 2, 1998

(86) PCT No.: PCT/FI98/00003

§ 371 (c)(1),
(2), (4) Date: Jun. 25, 1999

(87) PCT Pub. No.: WO98/31169

PCT Pub. Date: Jul. 16, 1998

(65) Prior Publication Data

US 2003/0114151 A1 Jun. 19, 2003

(30) Foreign Application Priority Data

Jan. 7, 1997 (FI) .................................................. 970073

(51) Int. Cl.[7] .................................................. H04Q 7/20
(52) U.S. Cl. .............................. 455/432.1; 455/414.1; 455/558
(58) Field of Search ................................ 455/419, 558, 455/551, 432, 435, 414, 432.1, 435.1, 414.1, 414.2

(56) References Cited

U.S. PATENT DOCUMENTS

| | | | | |
|---|---|---|---|---|
| 5,557,655 A | | 9/1996 | Lantto | |
| 5,881,235 A | * | 3/1999 | Mills | 395/200.51 |
| 5,884,168 A | * | 3/1999 | Kolev | 455/432 |
| 5,915,225 A | * | 6/1999 | Mills | 455/558 |
| 6,018,654 A | * | 1/2000 | Valentine | 455/414 |
| 6,038,445 A | * | 3/2000 | Alperovich et al. | 455/432.1 |
| 6,097,950 A | * | 8/2000 | Bertacchi | 455/432 |
| 6,345,184 B1 | * | 2/2002 | van der Salm et al. | 455/432 |
| 6,370,379 B1 | * | 4/2002 | Rugaard | 455/435.1 |

FOREIGN PATENT DOCUMENTS

| | | |
|---|---|---|
| DE | 44 15 734 | 2/1995 |
| EP | 0 562 890 A1 | 9/1993 |
| WO | WO 95/27382 | 10/1995 |
| WO | WO 95/32592 | 11/1995 |

OTHER PUBLICATIONS

Mouly, et al. *The GSM System of Mobile Communications*, 1992.

(List continued on next page.)

*Primary Examiner*—Nay Maung
*Assistant Examiner*—Nick Corsaro
(74) *Attorney, Agent, or Firm*—Squire, Sanders & Dempsey, L.L.P.

(57) ABSTRACT

A method and arrangement for implementing the acquisition of data relating to network-specific supplementary services and a method for updating subscriber data relating to network-specific supplementary services in a telecommunications system. The subscriber data relating to the network-specific supplementary services is permanently stored in a subscriber identity module (12) of a user terminal. The user terminal (11) is arranged, at least when registering in a visited network (30), to automatically transmit the subscriber data relating to the supplementary services of the visited network (30) for temporary storage to the subscriber database (34) of the visited network (30).

22 Claims, 5 Drawing Sheets

OTHER PUBLICATIONS

*European Telecommunications Standard*, "European digital cellular telecommunications system (Phase 2); Subscriber Identity Modules (SIM) Functional characteristics (GSM 02.17)" pp. 1–15, May 1994.

*European Telecommunication Standard*, "European digital cellular telecommunications system (Phase 2); Specification of the Subscriber Identity Module—Mobile Equipment (SIM—ME) interface (GSM 111.11)", pp. 1–93, 1994.

*GSM Technical Specification*, "Digital cellular telecommunications system; Unstructured Supplementary Service Data (USSD)—Stage 1 (GSM 02.90)", pp. 1–11, 1997.

*ETSI–GSM Technical Specification*, "European digital cellular telecommunication system (phase 1); Security–related Network Functions (GSM 03.20)", pp. 1–44, 1992.

*GSM Technical Specification*, "Digital cellular telecommunications system; Unstructured Supplementary Service Data (USSD)—Stage 2 (GSM 03.90)", pp. 1–35, 1996.

A copy of the International Search Report for PCT/FI98/00003.

* cited by examiner

METHOD AND ARRANGEMENT FOR HANDLING NETWORK SPECIFIC SUBSCRIBER DATA DURING ROAMING BY USE OF SIM CARD INFORMATION STORAGE

FIELD OF THE INVENTION

The invention relates to mobile systems and particularly to implementing the acquisition of data relating to network-specific supplementary services in a telecommunications system, which comprises at least two mobile systems comprising user terminals and mobile networks, which in turn comprise mobile switching centres and subscriber databases, in which system at least one mobile network comprises at least one network-specific supplementary service and in which system at least one user terminal functions at least in two different mobile networks and supports at least one network-specific supplementary service.

BACKGROUND OF THE INVENTION

Along with the development of mobile services, subscribers have been provided, in addition to conventional speech transmission, with a host of advanced teleservices. In addition to basic services provided free of charge, subscribers are offered several operator-specific and network-specific supplementary services.

The systems currently available include some by common agreements defined supplementary services; in some systems (such as in the GSM) the implementation of these services in the networks and in user terminals is highly standardized. Ever tighter competition has increased the need for different services and the tendency is towards an Intelligent Network (IN). The intelligent network is substantially an architecture which can be applied to telecommunications networks implemented with different network technologies. The intelligent network offers several modular functions, which can be interconnected in the planning and implementation of new services. The services are separate from the lowest level physical network structure, which allows each service to be offered in a substantially similar way, irrespective of in which network the operation takes place. Operators thus have more possibilities to diversify their range of services.

New services, however, set new demands also to the transmission of data and to its storage in the system. For this purpose e.g. in the GSM an Unstructured Supplementary Service Data (USSD) mechanism has been defined, which allows a subscriber and a service application to communicate with each other by character strings, in a way which is transparent to a user terminal and to the intermediate network elements.

Also the range of network technologies available has increased significantly. Several networks based on different technologies are already in commercial use, each one of which has its own advantages and restrictions. Digital European Cordless Telephone (DECT) is a telecommunications system developed within the ETSI for digital cordless communications and it usually operates within a frequency range of 1900 MHz. The DECT offers a good indoor coverage, high capacity and inexpensive call rates and user terminals. Equipment mobility in the DECT is, however, restricted and cell size varies between 25–100 metres, so a network of a working range covering e.g. a whole country is not practical to build with this technology.

Global System for Mobile Communications (GSM) is a widely spread pan-European mobile communications system standardized in the ETSI and it usually operates within a frequency range of 900 MHz. The GSM offers a reasonable indoor coverage and its cell size which can, when necessary, even exceed 30 km provides an extensive working range with reasonable cost. In addition, the large number of GSM operators ensures good opportunities for location monitoring all over the world. In densely populated areas capacity and optimization of the frequency spectrum are, however, becoming problematic in the GSM.

In a satellite mobile system, radio coverage is provided by means of satellites revolving around the earth, the satellites transmitting radio signals between User Terminals (UT) and Satellite Earth Stations (SES) in the same way as base stations. A beam provided by one satellite defines a coverage area, or cell, of a mobile system on the earth. The cells defined by satellites are arranged to form a continuous coverage area, whereby a mobile station is always within a coverage area. Since a satellite mobile network has a large cell size, the whole globe can, in principle, be covered by about ten satellites, depending on their orbit. Due to its configuration, a satellite system only covers outdoor areas; in other words, if a subscriber e.g. moves inside, the network connection weakens significantly or disappears.

The above shows that none of the technologies presented alone will solve all needs of the subscribers. A solution is offered by dual mode user terminals, which are capable of functioning in two networks implemented by different technology. Dual mode user terminals used in combinations GSM/DECT and GSM/DCS have already been presented, GSM/satellite user terminals are coming and as development advances, triple mode and even multimode user terminals are expected into the market. A typical feature in systems connected using dual, triple or multimode user terminals is that their network and switching sub-system (NSS) and the interface A between the network and switching sub-system and the radio system is based on existing PLMN network structures and the radio system is built according to the technology chosen.

The aim is that a subscriber moving from one network to another will have available all the supplementary network services that the subscriber's user terminal supports. Supplementary services are always associated with a certain amount of data which has to be stored in permanent subscriber databases and transferred to a system visited at a particular time. Conventionally arrangements made regarding subscriber data relating to supplementary services cause changes in the system's subscriber databases and protocols used for transferring said subscriber data. In connection with highly standardized systems already in use (such as the GSM), such changes are extremely difficult to implement and possibly even harmful to the compatibility achieved. As the number of network operators and the range of services increase, it is not reasonable to change the existing specifications to cater for new systems to be introduced in the future. This causes a significant problem as regards the introduction of new supplementary services.

BRIEF DESCRIPTION OF THE INVENTION

An object of the present invention is to provide a solution allowing network-specific supplementary services to be offered, without the need to change existing systems, to a subscriber who via a user terminal uses the facilities of at least two networks implemented by different mobile systems.

This object is achieved with an arrangement of the invention characterized in that subscriber data relating to network-specific supplementary services of visited networks is permanently stored in a subscriber identity module of a user terminal and that the user terminal is arranged, at least when registering in a visited network, to automatically transmit the subscriber data relating to the supplementary services of the visited network for temporary storage to the subscriber database of the visited network.

The invention also relates to a method for implementing the acquisition of data relating to network-specific supplementary services in a telecommunications system, which comprises at least two mobile systems, which in turn comprise user terminals and mobile networks comprising mobile switching centres and subscriber databases, at least one user terminal functioning not only in a home network but also in at least one visited network, said terminal supporting at least one network-specific supplementary service in said visited network, the method comprising the steps of initiating by said at least one user terminal the registration in the visited network, which comprises at least one network-specific supplementary service;
 transferring the data relating to the common services of the home network and the visited network, in connection with the registration, from the subscriber database of the home network for temporary storage to the subscriber database of the visited network. The invention is characterized in that the method further comprises
 permanently storing the subscriber data relating to the network-specific supplementary services of the visited network in the identity module of the user terminal,
 transmitting, at least in connection with the registration in the visited network, the subscriber data relating to the network-specific supplementary services from the identity module of the user terminal for temporary storage to the subscriber database of the visited network.

The invention further relates to a user terminal of a mobile system according to claim 9, said terminal functioning in at least two mobile networks implemented by different network technologies and supporting at least one network-specific supplementary service. The user terminal is characterized in that subscriber data relating to network-specific supplementary services is permanently stored in an identity module of the user terminal, and that the user terminal is arranged, at least when registering in a visited network, to automatically transmit the subscriber data relating to the supplementary services of the visited network for temporary storage to the subscriber database of the visited network.

The invention also relates to a method according to claim 16 for updating subscriber data relating to network-specific supplementary services in a telecommunications system, which comprises at least two mobile systems, which in turn comprise user terminals and mobile networks comprising mobile switching centres and subscriber databases, at least one user terminal functioning not only in a home network but also in at least one visited network, said terminal supporting at least one network-specific supplementary service in said visited network. The method is characterized by permanently storing subscriber data relating to the network-specific supplementary services of the visited network in an identity module of the user terminal,
 receiving a request of change concerning the subscriber data relating to a network-specific service,
 inquiring of a subscriber database of a home network for a routing address to a subscriber database of a subscriber's location area for routing the subscriber data relating to the network-specific supplementary services from a network providing the service to the subscriber database,
 establishing a radio connection between the user terminal and the network providing the service,
 performing the data transmission associated with the network-specific supplementary services between the user terminal and the network providing the service, for changing the subscriber data in the identity module,
 releasing the radio connection.

Home network here refers to that mobile network where the subscriber's user terminal is registered. Visited network correspondingly here refers to a mobile network which is not the subscriber's home network, but where the subscriber's user terminal can function.

The invention is based on the idea that subscriber data related to network-specific supplementary services is stored in those parts of the mobile system that are managed by the subscriber and the operator providing the supplementary services. In the solution according to the invention, subscriber data relating to network-specific supplementary services is permanently stored in the subscriber identity module of the subscriber terminal, from where it is transferred for temporary storage to the subscriber database of a visited network. Other subscriber data are read as usually from the subscriber database of the subscriber's home network. This allows limiting the changes concerning network-specific services to the network offering the service concerned. For instance, data relating to supplementary services of other networks are not needed in the subscriber database of the home network. Subscriber data related to network-specific services are transferred between the home network and a visited network using the protocols of the home network already available. The solution also includes the possibility of using a radio interface to change subscriber data relating to network-specific supplementary services from the network providing a particular service.

The present invention offers an inexpensive, easily implemented and well-functioning solution for arranging the acquisition of subscriber data between two different mobile systems in such a way that the subscriber will have available all network-specific supplementary services supported by the subscriber's user terminal. Since subscriber databases or protocols of systems not offering a particular service need not be changed, the solution enables voiding the long and laborious process of changing network-specific supplementary services to make them available to all subscribers visiting a network.

BRIEF DESCRIPTION OF THE DRAWINGS

In the following the invention will be described in greater detail with reference to the attached drawings, in which.

DETAILED DESCRIPTION OF THE INVENTION

Figure 1:
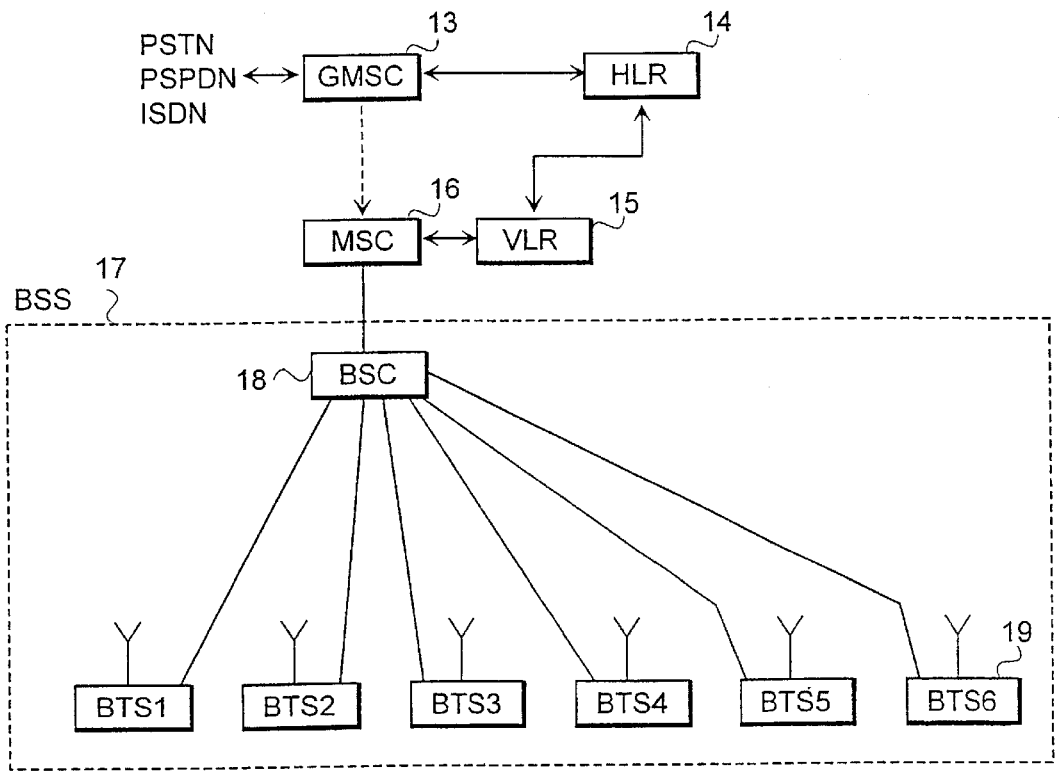
FIG. 1 is a block diagram illustrating the basic components of a GSM network.
Figure 1:
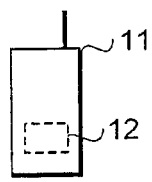

In FIG. 1 is briefly described the basic structural components of a GSM network functioning as a home network, without handling in greater detail their characteristics or other sectors of the system. With regard to a more detailed description of the GSM system, reference is made to the GSM standard and to M. Mouly and M. Pautet, *The GSM System for Mobile Communications,* Palaiseau, France, 1992, ISBN:2-9507190-0-0-7.

A mobile switching centre MSC 16 is responsible for switching incoming and outgoing calls. It performs similar functions as an exchange in a public switched telephone network (PSTN). In addition to these, it also performs functions only characteristic to mobile communication, such as subscriber location management, in cooperation with the subscriber registers of the network. The subscriber registers of the GSM system include a home location register HLR 14 and a visitor location register VLR 15. Mobile stations MS 11 functioning as user terminals are switched to the switching centre MSC 16 through base station systems. A base station sub-system BSS 17 comprises base station controllers BSC 18 and base stations BTS 19. One base station controller BSC 18 is used for controlling several base stations BTS 19. For the sake of clarity, FIG. 1 only shows one base station sub-system, in which a base station controller BSC 18 is associated with six base stations BTS1–BTS6. A mobile station MS 11 is associated with a subscriber identity module, a SIM card 12.

The subscriber identity module SIM 12 is a unit in which, e.g. according to GSM specifications, has to be stored all information elements a mobile station MS (user terminal UT 11) contains relating to a particular mobile subscriber. The remaining part of the mobile station, which is called mobile equipment ME, comprises the hardware and software specific to a radio interface. The GSM recommendation 02.17 determines the SIM functionality and the GSM recommendation 11.11 determines the command format and encoding in the SIM and the interface between the SIM and the ME. The SIM can be a smart card having an interface with the outside world, conforming to the ISO 7816 series in the ISO standard concerning IC cards. An IC card SIM of a standard size can be too big for portable radio equipment and thus a plug-in SIM can also be used, said SIM being a special module fully standardized within the GSM system and semi-permanently installed in the ME.

In the GSM system authentication of a mobile subscriber is based on the SIM. Although a mobile subscriber can use different mobile equipment ME, he always uses the same SIM and can thus be reached with the same subscriber number. When the SIM is used in a ME, it stores the security data relating to the subscriber (according to the GSM recommendation 02.09), e.g. a temporary mobile subscriber identifier TMSI and a key Ki, and performs the generating procedures of an authentication key and an encryption key according to the GSM recommendation 03.20 (i.e. algorithms A3 and A8). In addition, the storage capability of the SIM can make it possible to store and manage, in addition to GSM-specific services and features, additional information elements associated with a mobile subscriber. This characteristic can be utilized in the implementation of the present invention. The invention is not, however, meant to be restricted to a subscriber identity module of the GSM type. For instance, instead of a removable unit it is possible to use a subscriber identity module which is an integral part of the user terminal.

When a mobile station moves to a new location area (one or more cells) in a network, the mobile station MS 11 performs location updating, whereby the location data of the mobile station MS 11 and other data concerning the subscriber are updated between the home location register HLR 14 and the visitor location register VLR 15.

Figure 2:
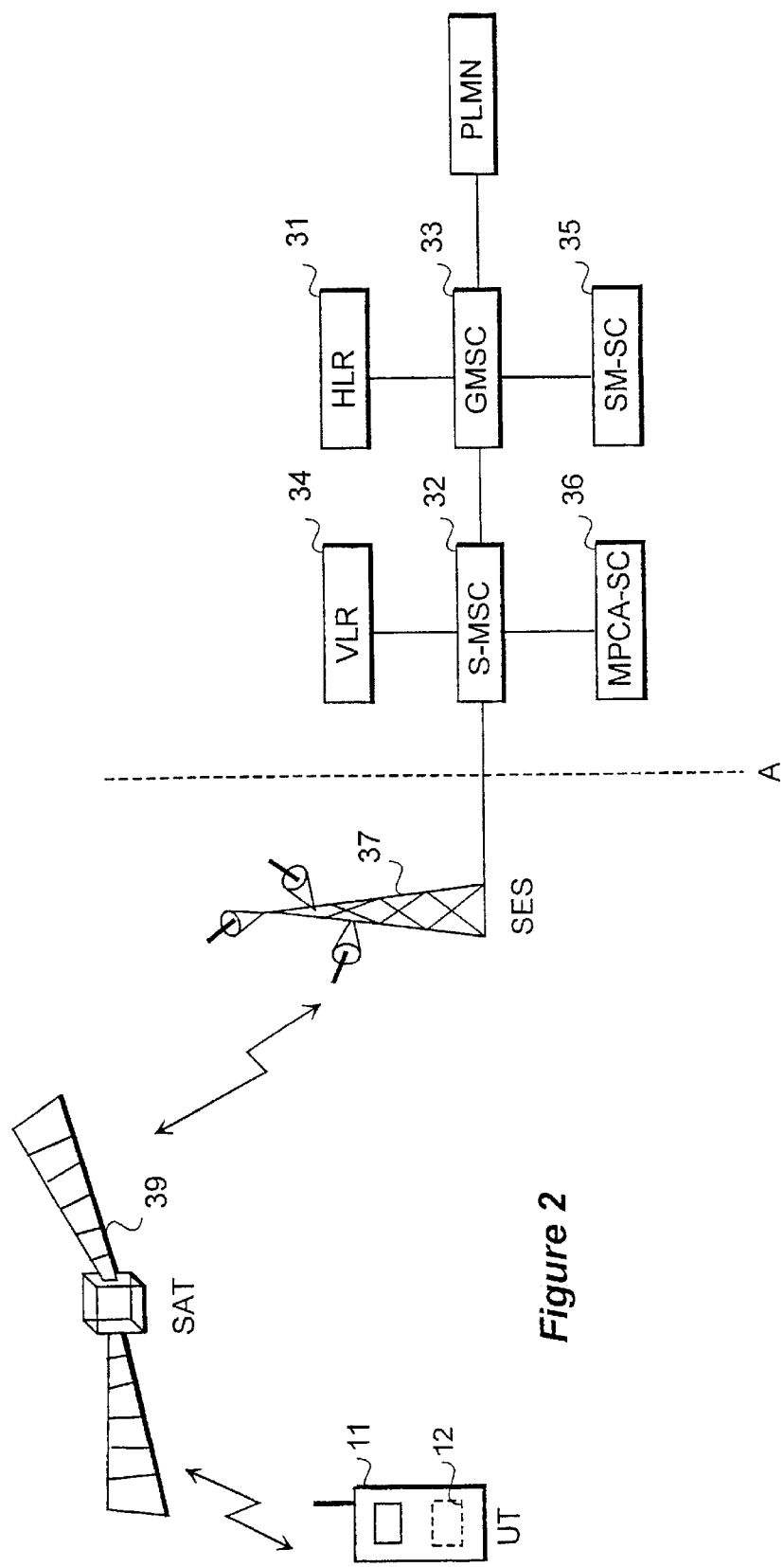
FIG. 2 is a block diagram illustrating the structural components of a satellite mobile system.

FIG. 2 is a diagram illustrating the basic components of a satellite mobile system. For a more detailed description of satellite mobile systems, reference is made to the ETSI specification ETR 093, 'Satellite Earth Stations (SES); Possible European Standardisation of Certain Aspects of Satellite Personal Communications Networks (S-PCN), Phase 1 Report,' UDC 621.396.946.

The base station system of a satellite mobile system comprises satellite earth stations SES 37 functioning as base station controllers and satellites SAT 39 functioning as base stations in orbit round the earth. For the sake of clarity, FIG. 1 shows only one satellite earth station SES 37 and one satellite SAT 39. In practice, the base station system comprises a plural number of satellites, each satellite SAT 39 being in contact, in succession, with different terrestrial earth stations SES 37 or other satellites SAT 39. The orbits of the satellites are designed so that a user terminal UT 11 is always within the area of at least one satellite SAT 39 and each satellite SAT 39 is always in contact with at least one earth station SES 37.

A satellite earth station SES 37 preferably comprises a plural number of antennas and is responsible for the RF and baseband processing needed in controlling a satellite connection as well as for call control functions. The earth station SES 37 is responsible for timing associated with the radio interface and also for routing as regards the satellite system. A user terminal UT 11 is connected to the system via a radio interface between a satellite SAT 39 and the user terminal UT 11.

In satellite systems, the terrestrial network can comprise a plural number of interconnected Satellite Access Nodes (SAN), which are also connected to a Network Management Centre (NMC), Operation Management Centre (OMC) and to a functionally centralized group of databases (HLR, AuC, EIR) used in mobility management and safety control. A satellite access node SAN typically comprises an earth station SES 37, a satellite mobile switching centre S-MSC 32 and a visitor location register VLR1 34. For the present invention, however, the physical location of the components within the network structure is not essential.

By using a Dual Mode user terminal UT 11, which functions both in a GSM network and in a satellite mobile network, a subscriber can use the facilities of the network available at a particular time. This situation is illustrated in the block diagram in FIG. 3. When moving to a cell in a visited network, the user terminal UT 11 performs location updating, whereby the subscriber data are updated between the home location register HLR 14 and the visitor location register VLR1 34 of the visited network. In connection with location updating, all subscriber data relating to the supplementary services of the GSM network are also updated to the visitor location register VLR1 34, these data including e.g. a call forwarding number used in connection with conditional call forwarding.

In satellite mobile systems, however, are also defined supplementary services not provided by the GSM network. One of these is the Medium Penetration Call Announcement (MPCA) service, which is used to deliver to a user terminal UT 11 located in a shadow region (e.g. inside a building) a paging message with a high penetration signal transmitted from a satellite, said message indicating to the subscriber that the system attempts to contact the subscriber or that in the system is stored data destined to the subscriber.

Said service includes a channel operating with higher transmission power than normally, said channel being arranged in the mobile system and giving the signal burst transmitted a significantly better chance of reaching the user terminal despite attenuation. When the user terminal detects that it is in a shadow region, it proceeds to listen to a channel allocated for a high penetration paging message. When the system attempts to reach a subscriber but the attempts by normal network arrangements are unsuccessful, a high penetration paging message is issued and transmitted to the subscriber on said channel. After receiving the message, the subscriber can move away from the shadow region and contact the system.

To implement the service, a separate service centre associated with a high penetration paging message is added to the mobile system, the service centre being essentially an administrative database. When the paging of a subscriber is unsuccessful, the functional unit of the mobile system responsible for call set-up and mobility management, e.g. a mobile exchange, forwards information about the failed paging to the service centre. In the service centre is issued a paging message, and the message is forwarded by a high penetration signal burst to the user terminal in the system.

Figure 3:
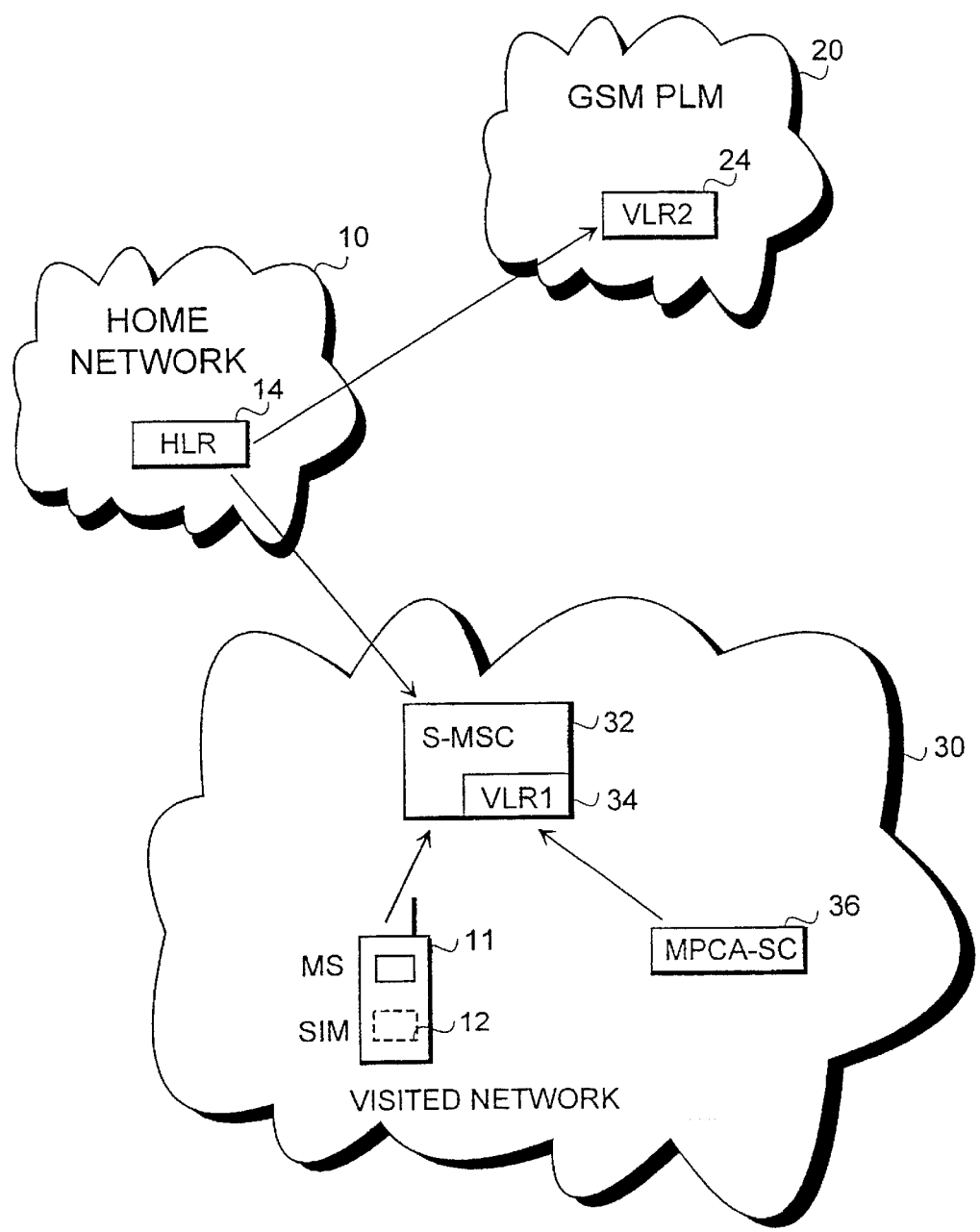
FIG. 3 is a block diagram and FIG. 4 is a corresponding signalling diagram illustrating an arrangement according to the invention for implementing the acquisition of subscriber data relating to a network-specific supplementary service.

FIG. 3 is a block diagram illustrating an arrangement of the invention with which a GSM network subscriber, whose user terminal UT 11 also functions in a satellite mobile system, can use, when necessary, an MPCA service provided by a satellite mobile network 30. The subscriber's home network 10 is a GSM network and the subscriber also has, within normal location updating, the networks 20 of other GSM operators at his disposal. The subscriber's user terminal is arranged to also function in a predetermined non-GSM network, which in this case is the satellite mobile network 30. Since the MPCA is not a supplementary service typically supported by the GSM, permanent subscriber data relating to the MPCA service, such as data on the subscriber's authorization to use the MPCA service, is not stored in the subscriber's home location register HLR 14. According to the solution of the invention, subscriber data relating to a supplementary service provided by a satellite mobile network is stored in the SIM card, the identity module 12 of the subscriber's user terminal UT 11.

When the subscriber registers in the satellite mobile network 30, the user terminal 11 performs location updating, whereby data on the location of the user terminal and other data relating to the subscriber are transferred, in accordance with GSM specifications, to the visitor location register VLR1 34 in the visited network. In accordance with the invention, as the location updating according to the GSM specifications is completed, an operation is automatically activated whereby the data on the subscriber's authorization to use the MPCA service stored in the SIM card 12 is transferred from the SIM card 13 in the user terminal 11 to the visitor location register VLR1 34 in the visited network. The data transmission from the user terminal 11 to the visited network 30 is performed using for instance a USSD function. The USSD function can be performed using a radio connection established in connection with location updating, or a completed location updating can activate the establishment of a radio connection for data transmission according to the USSD. As regards USSD data transmission, reference is made to the GSM recommendations 02.90 and 03.90.

After location updating, a received USSD message is analyzed at a mobile switching centre S-MSCNLR 32, 34 of the satellite mobile network 30 and after the subscriber data concerned has been confirmed to relate to an MPCA service belonging to the satellite mobile network 30, the data is recorded in the visitor location register VLR1 34 of the satellite mobile network.

The solution of the invention also includes the possibility of changing via the radio path the data stored in a SIM card. In this case the subscriber does not need to submit his SIM card to the operator providing a particular supplementary service every time said supplementary service is to be changed. It is possible to arrange in the satellite mobile network 30 and in the user terminal UT 11 a manufacturer-specific Man to Machine Interface (MMI), but then changes can be made only when the subscriber is registered in a visited network 30. Using the radio path allows making changes also when the user interface 11 is controlled for instance by another GSM network 20.

Figure 4:
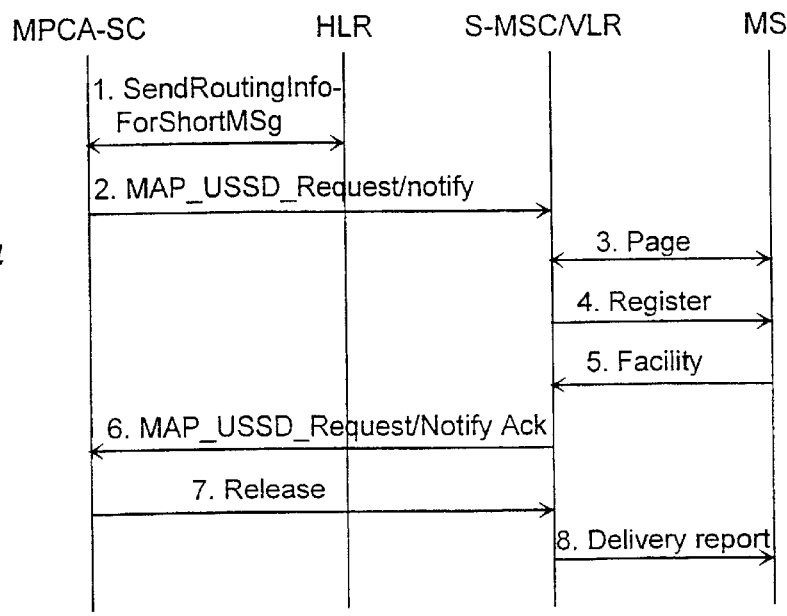

FIG. 4 shows a signalling diagram illustrating data transmission according to the embodiment described above, used for inquiring or changing subscriber data related to an MPCA service in a user terminal UT 11 operating in a GSM and satellite mobile network 30. A problem with a user terminal 11 functioning either in a home network 10 or in another network 20 within the subscriber's working range is that the system offering a network-specific supplementary service does not know the location of the user terminal, because the subscriber has not performed location updating within the area of the network. In the solution of the invention a paging centre MPCA-SC 36 transmits to the subscriber's home location register HLR 14 a short message routing inquiry GMSC MAP/C (SendRoutinginfoForShortMsg) determined in the GSM specification. After having received the address of the visitor location register VLR2 24 sent by the home location register HLR 14, the paging centre MPCA-SC 36 generates a USSD message, instead of a short message, and sends it to the visitor location register VLR2 24. The visitor location register VLR2 24 pages the user terminal 11 and performs with the user terminal the data transmission associated with supplementary services for instance by using messages MAP/I REGISTER, ACTIVATE, DEACTIVATE, ERASE and FACILITY. The user terminal 11 changes the data on the SIM card 12 according to the commands received from the satellite mobile network 30. After the data transmission has been completed, the visitor location register VLR2 24 transmits to the paging centre MPCA-SC 36 a USSD acknowledgement, whereby the paging centre releases the connection (RELEASE) and the visitor location register VLR2 24 sends the user terminal UT 11 a notification about a successful location updating.

It is to be noted that it is not essential to the invention what messages are used to implement said functions. What is essential is that both he home network and the visited network support the protocol used for data transmission.

Figure 6:
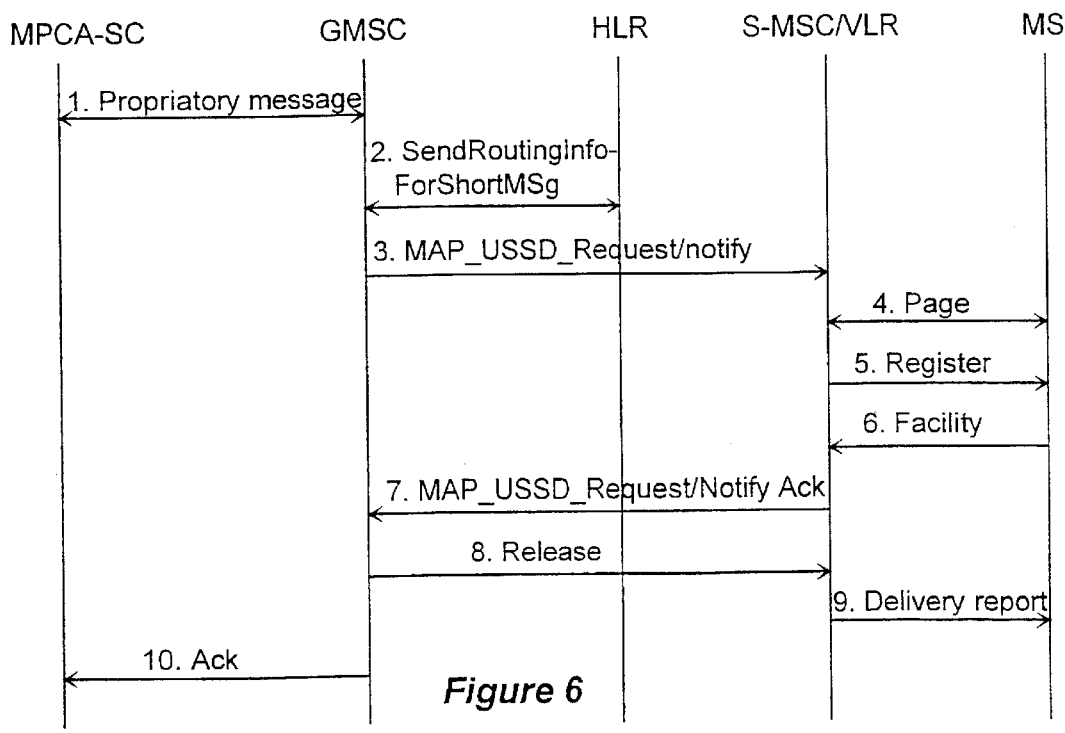
Figure 5:
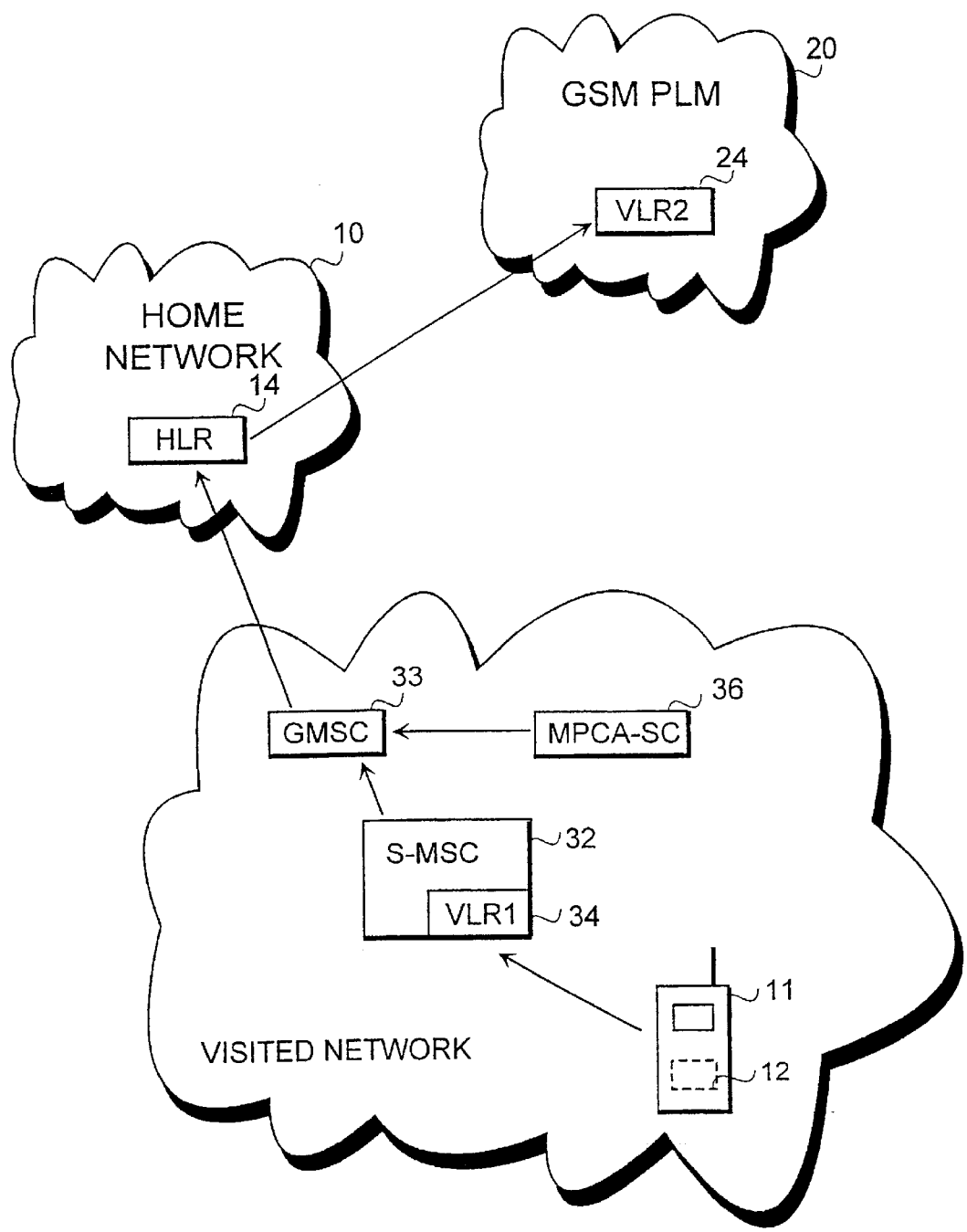
FIG. 5 is a block diagram and FIG. 6 a corresponding signalling diagram illustrating an alternative embodiment for an arrangement according to the invention for implementing data transmission relating to a network-specific supplementary service.

FIG. 5 is a block diagram and FIG. 6 a signalling diagram illustrating an implementation of the solution of the invention. The solution illustrated in FIGS. 5 and 6 primarily follows the preferred embodiment of the invention illustrated by FIGS. 3 and 4. An essential difference from the preferred embodiment is that the functionality of the data transmission associated with network-specific services and with the paging of a user terminal is the responsibility of a gateway switching centre GMSC 33 of a satellite system functioning as the gateway exchange for the paging centres concerned.

After having received a request for updating subscriber data stored in an identity module of a subscriber related to an MPCA service, the gateway switching centre GMSC 33 sends the subscriber's home location register HLR 14 a routing inquiry (SendRoutinginfoForShortMsg) for a GMSC MAP/C short message defined in the GSM specification. After having received the address of the visitor location register VLR2 24 sent by the home location register HLR 14, the gateway switching centre GMSC 33 generates an appropriate USSD message and transmits it to the visitor location register VLR2 24. The visitor location register VLR2 24 pages the user terminal 11 and performs with the user terminal the data transmission associated with supplementary services defined in the GSM, using for instance applicable MAP/I messages. The user terminal 11 changes the data on the SIM card 12 according to the commands received from the satellite mobile network 30. When the data transmission is completed, the visitor location register VLR2 24 sends to the gateway switching centre GMSC 33 a USSD acknowledgement, whereby the paging centre MPCA-SC 36 releases the connection (RELEASE). After the connection has been released, the visitor location register VLR2 24 sends the user terminal UT 11 a notification about a successful updating of the subscriber data and the gateway switching centre GMSC 33 sends an acknowledgement about the completion of the operation to the paging centre MPCA-SC 36.

The drawings and the description relating to them are intended only to illustrate the idea of the invention. The solution of the invention can vary in its details within the scope of the claims. The embodiments described above illustrate the use of the invention in the environment chosen as the example. It will be apparent to a person skilled in the art that the invention can be also applied to other telecommunications systems. The invention is described above mainly in connection with a GSM and a satellite mobile network, but an arrangement of the invention can be utilized for implementing the acquisition of data in connection with services provided in all open and closed mobile systems.

What is claimed is:

1. An arrangement for implementing the acquisition of data relating to network-specific supplementary services in a telecommunications system,
   which comprises at least two mobile systems comprising user terminals and mobile networks, which in turn comprise mobile switching centres and subscriber databases;
   in which system at least one mobile network comprises at least one network-specific supplementary service;
   in which system at least one user terminal functions at least in two different mobile networks and supports the at least one network-specific supplementary service; wherein
   subscriber data relating to network-specific supplementary services of visited networks is permanently stored in a subscriber identity module of a user terminal, the subscriber data defining the at least one network specific supplementary service of visited networks, and
   the user terminal is arranged, at least when registering in a visited network, to automatically transmit the subscriber data relating to the supplementary services of the visited network for temporary storage to the subscriber database of the visited network.

2. The arrangement according to claim 1, wherein the subscriber data relating to the network-specific supplementary services stored in the identity module of the user terminal is transferred to the subscriber database of the visited network through a radio connection used in the registration in the visited network.

3. The arrangement according to claim 1, wherein after registering in the network, the user interface immediately establishes a new radio connection for transferring the subscriber data relating to the network-specific supplementary services from the identity module of the user terminal to the subscriber database of the visited network.

4. The arrangement according to claim 2, wherein the data transmission is performed according to a USSD data transmission defined by a GSM standard.

5. The arrangement according to claim 2, wherein the user terminal comprises means for updating, from the network providing a supplementary service, the subscriber data stored in the identity module on the basis of a message transmitted over the radio path.

6. The arrangement according to claim 5, wherein a service centre arranged in the network providing the network-specific supplementary service comprises means for the data transmission associated with network-specific supplementary services.

7. The arrangement according to claim 5, wherein a gateway switching centre of the network providing the network-specific supplementary service comprises means for updating the subscriber data relating to network-specific supplementary services.

8. The arrangement according to claim 6, wherein the means for updating the subscriber data relating to the network-specific supplementary services comprise the use of a short message routing inquiry.

9. The arrangement according to claim 3, wherein the data transmission is performed to a USSD data transmission defined by a GSM standard.

10. The arrangement according to claim 3, wherein the user terminal comprises means for updating, from the network providing a supplementary service, the subscriber data stored in the identity module on the basis of a message transmitted over the radio path.

11. The arrangement according to claim 4, wherein the user terminal comprises means for updating, from the network providing a supplementary service, the subscriber data stored in the identity module on the basis of a message transmitted over the radio path.

12. The arrangement according to claim 9, wherein the user terminal comprises means for updating, from the network providing a supplementary service, the subscriber data stored in the identity module on the basis of a message transmitted over the radio path.

13. The arrangement according to claim 7, wherein the means for updating the subscriber data relating to the network-specific supplementary services comprise the use of a short message routing inquiry.

14. A user terminal of a mobile system, said terminal functioning in at least two mobile networks implemented by different network technologies and supporting at least one network-specific supplementary service, wherein
    subscriber data relating to network-specific supplementary services is permanently stored in an identity module of the user terminal, the subscriber data defining the at least one network specific supplementary service, and
    the user terminal is arranged, at least when registering in a visited network, to automatically transmit the subscriber data relating to the supplementary services of the visited network for temporary storage to the subscriber database of the visited network.

15. The user terminal of a mobile system according to claim 14, wherein the user terminal comprises means for transferring the subscriber data relating to the network-specific supplementary services from the identity module of the user terminal to the subscriber database of the visited network immediately after registration, through one and the same radio connection.

16. The user terminal of a mobile system according to claim 14, wherein the user terminal comprises means for establishing immediately after the registration a new radio connection for transferring the subscriber data relating to the network-specific supplementary services from the identity module of the user terminal to the subscriber database of the visited network.

17. The user terminal of a mobile system according to claim 14, wherein the user terminal comprises means for updating the subscriber data stored in the identity module from the network providing a supplementary service on the basis of a message transmitted over the radio path.

18. A method for implementing the acquisition of data relating to network-specific supplementary services in a telecommunications system, which comprises at least two mobile systems, which in turn comprise user terminals and mobile networks comprising mobile switching centres and subscriber databases, at least one user terminal functioning not only in a home network but also in at least one visited network, said terminal supporting at least one network-specific supplementary service in said visited network, the method comprising the steps of initiating by said at least one user terminal the registration in the visited network, which comprises at least one network-specific supplementary service;

transferring subscriber data relating to the common services of the home network and the visited network, in connection with the registration, from the subscriber database of the home network for temporary storage to the subscriber database of the visited network, permanently storing subscriber data relating to the network-specific supplementary services of the visited network in the identity module of the user terminal, the subscriber data defining network specific supplementary services in the visited network, and transmitting, at least in connection with the registration in the visited network, the subscriber data relating to the network-specific supplementary services from the identity module of the user terminal for temporary storage to the subscriber database of the visited network.

19. The method according to claim 18, wherein the subscriber data related to the network-specific supplementary services is automatically sent from the identity module of the user terminal to the subscriber database of the visited network in connection with the registration in the visited network, through one and the same radio connection.

20. The method according to claim 18, wherein after the registration in the visited network, a new radio connection is immediately established for transferring the subscriber data relating to the network-specific supplementary services from the Identity module of the user terminal to the subscriber database of the visited network.

21. A method for updating subscriber data relating to network-specific supplementary services in a telecommunications system, which comprises at least two mobile systems, which in turn comprise user terminals and mobile networks comprising mobile switching centres and subscriber databases, at least one user terminal functioning not only in a home network but also in at least one visited network, said terminal supporting at least one network-specific supplementary service in said visited network, the method comprising permanently storing subscriber data relating to the network-specific supplementary services of the visited network in an identity module of the user terminal, the subscriber data defining network specific supplementary services obtainable from the visited network, receiving a request of change concerning the subscriber data relating to a network-specific service, inquiring of a subscriber database of a home network for a routing address to a subscriber database of a subscriber's location area for routing the subscriber data relating to the network-specific supplementary services from a network providing the service to the subscriber database, establishing a radio connection between the user terminal and the network providing the service, performing the data transmission associated with the network-specific supplementary services between the user terminal and the network providing the service, for changing the subscriber data in the identity module, releasing the radio connection.

22. The method according to claim 21, wherein the routing address of the subscriber database of the subscriber's location area is inquired using a short message routing inquiry.

* * * * *